United States Patent
Nakazawa

[11] Patent Number: 6,160,671
[45] Date of Patent: Dec. 12, 2000

[54] RETRO-FOCUS LENS

[75] Inventor: Kimiaki Nakazawa, Saitama, Japan

[73] Assignee: Fuji Photo Optical Co., Ltd., Omiya, Japan

[21] Appl. No.: 09/268,641

[22] Filed: Mar. 16, 1999

[30] Foreign Application Priority Data

Mar. 20, 1998  [JP]  Japan ................................. 10-092619
Nov. 30, 1998  [JP]  Japan ................................. 10-339004

[51] Int. Cl.$^7$ .............................. G02B 13/04; G02B 3/02; G02B 3/00
[52] U.S. Cl. .......................... 359/749; 359/751; 359/753; 359/708; 359/649; 359/651
[58] Field of Search ........................... 359/708, 713–716, 359/749–753, 754, 761, 770, 771, 781–784, 649–651

[56] References Cited

U.S. PATENT DOCUMENTS 5,812,326  9/1998  Yamada ................................. 359/759
5,949,589  9/1999  Nakazawa ............................. 359/753

FOREIGN PATENT DOCUMENTS

9-96759  4/1997  Japan .

*Primary Examiner*—Georgia Epps
*Assistant Examiner*—David N. Spector
*Attorney, Agent, or Firm*—Arnold International; Bruce Y. Arnold

[57] ABSTRACT

A retro focus lens having three lens groups arranged, in order from the longer conjugate length side of the lens, as follows: a negative first lens group $G_1$, a positive second lens group $G_2$, and a positive third lens group $G_3$. The first group $G_1$ includes, in order from the longer conjugate length side of the lens, a first lens element $L_1$ of small positive refractive power and made of plastic with an aspherical surface, a second lens element $L_2$ of negative refractive power that is made of glass and has a concave surface facing the shorter conjugate length side of the lens, and a third lens element $L_3$ of negative refractive power with a concave surface facing the shorter conjugate length side of the lens, there being no additional lens elements between the first lens element $L_1$ and the third lens element $L_3$. By satisfying preferred conditions, favorable chromatic aberrations and distortion are attained while achieving a high resolution and a sufficiently large back focus to allow the lens to be used as a projection lens for liquid crystal color projectors.

12 Claims, 4 Drawing Sheets

RETRO-FOCUS LENS

BACKGROUND OF THE INVENTION

A projection lens having a long back focus is conventionally required in color projectors that employ liquid crystal display panels which modulate differently colored beams of light with image information for that color, so that a beam-combining prism may be inserted between the lens and the display panels in order to compose the color information into a single, full-color display that is then projected as full-color image onto a projection screen. In order to provide a large projected image using a short projection distance, it is necessary to widen the angle of view of the projection lens. Moreover, a low distortion lens is required in order to project images, which have been formed using liquid crystal display panels having an aperture shaped as a rectangle, without pin-cushion or barrel distortion noticeably affecting the rectangular outline of the projected light.

A retro-focus lens having a wide angle of view and a long back focus is known and has been used as a wide-angle lens for single-lens reflex cameras. However, such a retro-focus lens has a large exit angle and its luminous flux is not telecentric. Thus, in using such a lens with a liquid crystal projector there is a problem in that images projected onto a projection screen have irregular colors.

In order to solve such problems, the applicant of the present invention has previously disclosed, in Japanese Laid-Open Patent Application H09-096759, a projection lens that has a long back focus, forms a luminous flux with sufficient telecentric properties so as to avoid irregular colors when used with a liquid crystal projector, and is well-corrected for distortion.

As the number of pixels in liquid crystal display panels being sold has tended to increase with each passing year of technological advancement, the size of each pixel has tended to decrease, and this creates a need for projection lenses which have higher resolution. Therefore, it is desired to provide a projection lens having higher resolution and better correction of chromatic aberrations and distortion than provided by the lens disclosed in the above-noted laid-open patent application.

BRIEF SUMMARY OF THE INVENTION

The present invention relates to a retro-focus lens, particularly to a retro-focus lens for use in a liquid crystal color projector which enlarges and projects onto a projection screen, color picture information which has been composed by a color-combining cube (e.g., a dichroic beam-combiner).

A first object of the present invention is to provide a retro-focus lens having a wider angle of view. A second object of the invention is to maintain a sufficient back focus to allow insertion of a color-combining cube into the optical path on the shorter conjugate length side of the lens. A third object of the invention is to provide a lens having sufficient telecentric properties so that irregular colors do not arise when projecting images, which are formed by liquid crystal display panels, onto a projection screen that may be positioned at the longer conjugate of the lens. A fourth object of the invention is to provide a retro-focus lens having higher resolution, especially one with low distortion and low chromatic aberration.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The retro-focus lens of the present invention includes, in order from the longer conjugate length side of the lens: a first lens group having negative refractive power, a second lens group having positive refractive power and a third lens group having positive refractive power. The first lens group includes: a first lens element of positive refractive power and made of plastic with at least the surface on the longer conjugate length side of the lens being aspherical; a second lens element of glass having negative refractive power, with a concave surface on the shorter conjugate length side of the lens; and a third lens element having negative refractive power with a concave surface on the shorter conjugate length side of the lens. The second lens group includes, in order from the longer conjugate length side of the lens, a fourth lens element having negative refractive power and a fifth lens element having positive refractive power, with the fourth and fifth lens elements cemented together. The third lens group includes a plastic lens element having two surfaces of different refractive power, at least one of which is aspherical, with the surface of smaller refractive power being on the longer conjugate length side of the lens.

Further, the below Conditions (1)–(7) are preferably satisfied:

| | |
|---|---|
| $B_f/f > 2.1$ | Condition (1) |
| $|f_1/f| > 35.0$ | Condition (2) |
| $|f_6/f| > 25.0$ | Condition (3) |
| $-0.1 < f/f_{G12} < 0.25$ | Condition (4) |
| $-1.9 < f_{G12}/f < -1.0$ | Condition (5) |
| $1.6 < f_{G3}/f < 2.8$ | Condition (6) |
| $\nu_8 - \nu_{10} > 20$ | Condition (7) | where, $B_f$ is the back focus of the retro-focus lens, f is the focal length of the retro-focus lens, $f_1$ is the focal length of the first lens element, $f_6$ is the focal length of the sixth lens element, $f_{G12}$ is the composite focal length of the first lens group and the second lens group, $f_{G1}$ is the focal length of the first lens group, $f_{G3}$ is the focal length of the third lens group,
$v_8$ is the Abbe number of the fourth lens element, and
$v_{10}$ is the Abbe number of the fifth lens element.

Also, it is preferable that the above-mentioned plastic lens element of the third lens group be the sixth lens element, in order from the longer conjugate length side of the lens, and that this lens group also includes a seventh lens element having negative refractive power, an eighth lens element having positive refractive power, and a ninth lens element having positive refractive power. The seventh lens element and the eighth lens element may be cemented together and satisfy Condition (8) below:

$$v_{14}-v_{13}>32 \qquad \text{Condition (8)}$$

where $v_{14}$ is the Abbe number of the eighth lens element, in order from the longer conjugate length side of the retro-focus lens and $v_{13}$ is the Abbe number of the seventh lens element, in order from the longer conjugate length side of the retro-focus lens.

Two embodiments of the retro-focus lens of the invention, each intended for use as a projection lens of a liquid crystal projector, will now be described with reference to the drawings. Because identical reference numerals are used in the drawings for the same elements, redundant explanations in the discussion of the second embodiment will be omitted.

Embodiment 1

Figure 1:
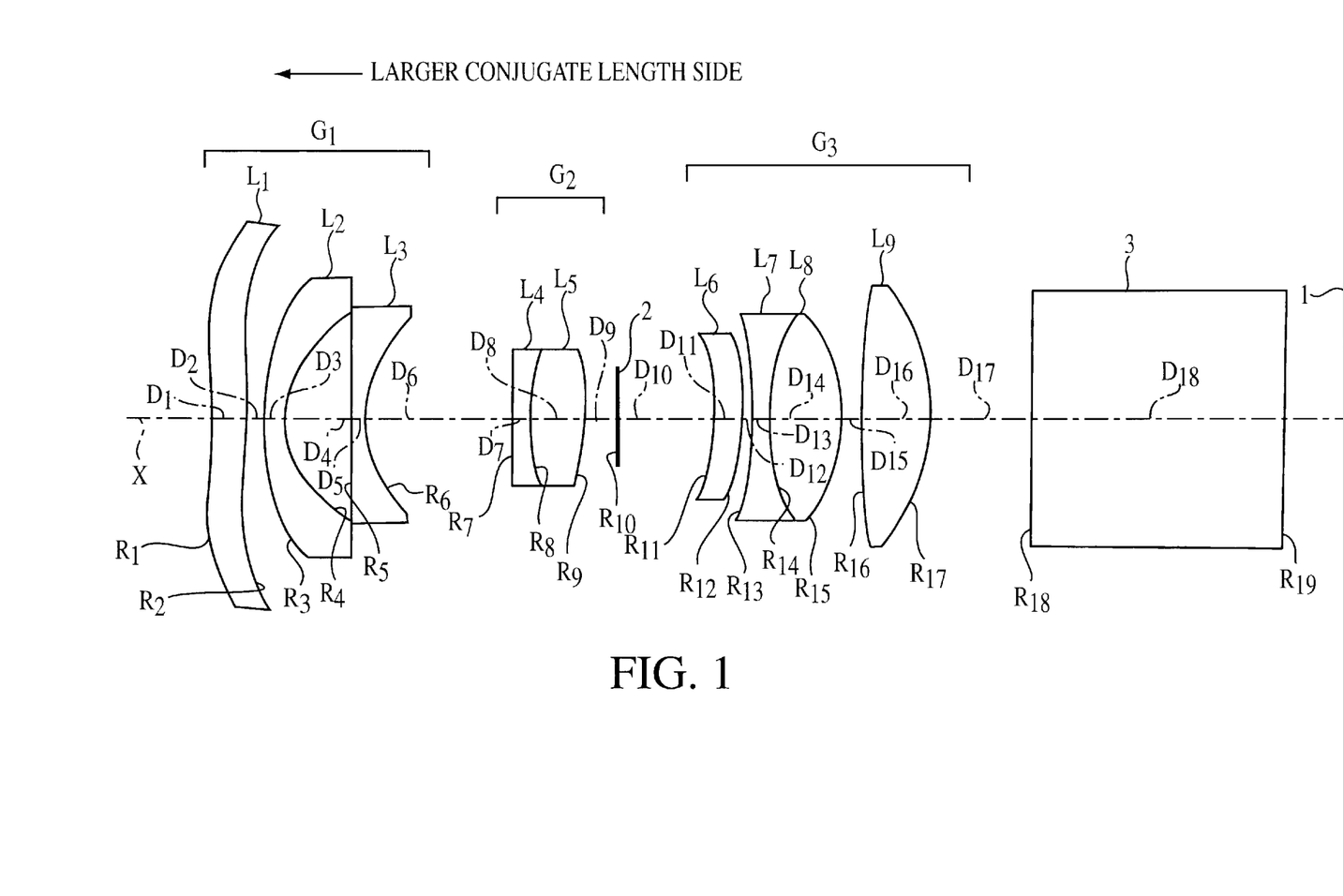
FIG. 1 shows the basic lens element structure of Embodiment 1.

Referring to FIG. 1, differently colored light beams from three liquid crystal display panels 1 (for clarity of illustration, only one panel is shown) are combined using a dichroic beam-combining cube 3 and are then projected onto a projection screen (not shown) located to the left of the figure (i.e., on the longer conjugate length side of the lens) for viewing a full-color image. The retro-focus lens includes, in order from the longer conjugate length side of the lens: a first lens group $G_1$ having negative refractive power, a second lens group $G_2$ having positive refractive power and a third lens group $G_3$ having positive refractive power. The first lens group $G_1$ includes a first lens element $L_1$ of small positive refractive power and made of plastic with at least one aspherical surface, a second lens element $L_2$ of glass having negative refractive power with a concave surface on the shorter conjugate length side of the lens, and a third lens element $L_3$ of negative refractive power with a concave surface on the shorter conjugate length side of the lens. The second lens group $G_2$ includes, in order from the longer conjugate length side of the lens, a fourth lens element $L_4$ of negative refractive power and a fifth lens element $L_5$ of positive refractive power, and the lens elements $L_4$ and $L_5$ are cemented together. The third lens group $G_3$, includes, in order from the longer conjugate length side of the lens, a sixth lens element $L_6$ made of plastic and having at least one aspherical surface, a seventh lens element $L_7$ having negative refractive power, an eighth lens element $L_8$ having positive refractive power, and a ninth lens element $L_9$ having positive refractive power. Further, the seventh lens element $L_7$ and the eighth lens element $L_8$ are cemented together. In addition, a diaphragm 2 is arranged along the optical axis X between the second lens group $G_2$ and the third lens group $G_3$. In this embodiment each of the above Conditions (1)–(8) is satisfied.

Next, the above Conditions (1)–(8) will be explained.

Condition (1) is for maintaining a sufficient back focus length. Without this condition being satisfied, it will be difficult to insert a color combining cube or prism between the final lens element of the retro-focus lens and the display panels.

Conditions (2) and (3) prevent the deterioration of optical properties due to temperature changes, and regulate the refractive power of each plastic aspherical lens element. Without conditions (2) and (3) being satisfied, the refractive power of the plastic lens elements becomes so strong that the deterioration of optical properties due to temperature changes becomes large.

Condition (4) regulates the composite refractive power of the first lens group $G_1$ and the second lens group $G_2$. When the upper limit is surpassed, there is an insufficient back focus of the retro-focus lens. On the other hand, when the lower limit is not satisfied the refractive power of the sixth lens element $L_6$ becomes so large that the spherical aberration resulting from temperature changes becomes excessive. Furthermore, Condition (5) regulates the composite refractive power of the first lens group $G_1$. Below the lower limit, the generation of distortion aberrations becomes excessive, so that the correction at the aspherical surface of the first lens group $G_1$ must be increased. As a result, the refractive power of the first lens group $G_1$ increases, and effects resulting from temperature changes become excessive. On the other hand, when the upper limit is surpassed, the lens system as a whole becomes larger than is desired.

Also, Condition (6) regulates the refractive power of the third lens group $G_3$. Below the lower limit, it becomes difficult to provide a sufficient back focus length. On the other hand, when the upper limit is surpassed, the lens system becomes too large. Furthermore, the refractive power of the first lens group $G_1$ and the second lens group $G_2$ must be increased so as to provide a sufficiently wide image angle. As a result, distortion and curvature of field become large, and corrections of these aberrations become difficult.

Moreover, Condition (7) regulates the lateral color. Below the lower limit, the lateral color is so large that it becomes difficult to correct.

Also, Condition (8) regulates the longitudinal chromatic aberration. Below the lower limit, the longitudinal chromatic aberration becomes excessive and is difficult to correct.

In addition, since plastic materials applicable to an optical system are limited, it is necessary to use glass material to properly correct for the chromatic aberration.

The upper section of Table 1 below lists the surface number #, in order from the longer conjugate length side of the lens, the radius of curvature R (in mm) of each surface near the optical axis, the on-axis spacing D (in mm) between each surface, as well as the index of refraction $N_d$ and the Abbe number $v_d$ (at the sodium d line) of each lens element of Embodiment 1. Those surfaces with a * to the right of the surface number in Table 1 are aspherical surfaces, and the aspherical surface shape is expressed by Eq. (A) below.

$$Z=cY^2/\{1+(1-Kc^2Y^2)^{1/2}\}+A_4Y^4+A_6Y^6+A_8Y^8+A_{10}Y^{10} \quad \text{(Equation A)}$$

where

Z is the length (in mm) of a line drawn from a point on the aspherical surface at height Y from the optical axis to the tangential plane of the aspherical surface vertex, $c(=1/R)$ is the curvature of the aspherical surface near the optical axis, Y is the height (in mm) from the optical axis, K is the eccentricity, and $A_4$, $A_6$, $A_8$, and $A_{10}$ are the 4th, 6th, 8th, and 10th aspherical coefficients.

In the lower section of the Table 1 are listed the focal distance f, the f-number (hereinafter $F_{NO}$), and the image angle 2 ω of the retro-focus lens of this embodiment.

TABLE 1

| # | R | D | $N_d$ | $v_d$ |
|---|---|---|---|---|
| 1* | −8.190 | 0.307 | 1.50918 | 52.0 |
| 2* | −6.091 | 0.108 | | |
| 3 | 2.263 | 0.184 | 1.58913 | 61.3 |
| 4 | 1.073 | 0.528 | | |
| 5 | 21.612 | 0.153 | 1.58144 | 40.9 |
| 6 | 1.239 | 1.223 | | |
| 7 | 20.827 | 0.134 | 1.51680 | 64.2 |
| 8 | 1.479 | 0.480 | 1.72342 | 38.0 |
| 9 | −2.881 | 0.274 | | |
| 10 | ∞ | 0.825 | | |
| 11* | −2.363 | 0.230 | 1.50918 | 52.0 |
| 12* | −2.109 | 0.088 | | |
| 13 | −3.680 | 0.142 | 1.84666 | 23.8 |
| 14 | 2.051 | 0.614 | 1.48749 | 70.4 |
| 15 | −1.601 | 0.178 | | |
| 16 | 7.757 | 0.596 | 1.62041 | 60.3 |
| 17 | −1.927 | 0.855 | | |
| 18 | ∞ | 2.109 | 1.51680 | 64.2 |
| 19 | ∞ | | | |
| | f = 1.0 | $F_{NO}$ = 2.5 | $2\tilde{\omega}$ = 83.0° | |

Moreover, as shown in the bottom portion of Table 1, the focal length f of the retro-focus lens is 1.0, the $F_{NO}$ is 2.5 and the image angle 2 ω is 83.0° for this embodiment.

In Table 2, the eccentricity K and the aspherical coefficients $A_4$, $A_6$, $A_8$, and $A_{10}$ are shown for those surfaces indicated in Table 1 as being aspherical.

TABLE 2

| # | K | $A_4$ | $A_6$ | $A_8$ | $A_{10}$ |
|---|---|---|---|---|---|
| 1 | 1.06852 | 0.55871 × 10⁻¹ | −0.46584 × 10⁻² | 0.79567 × 10⁻³ | 0.17362 × 10⁻⁴ |
| 2 | 1.03258 | 0.57345 × 10⁻¹ | −0.21976 × 10⁻² | −0.23895 × 10⁻³ | −0.33313 × 10⁻⁷ |
| 11 | 2.13853 | −0.22042 × 10⁻¹ | 0.48493 × 10⁻³ | 0.18905 × 10⁻⁴ | 0.14778 × 10⁻⁶ |
| 12 | 0.00810 | 0.93418 × 10⁻¹ | 0.45254 × 10⁻³ | −0.33143 × 10⁻⁴ | −0.13049 × 10⁻⁶ |

Embodiment 2

Figure 2:
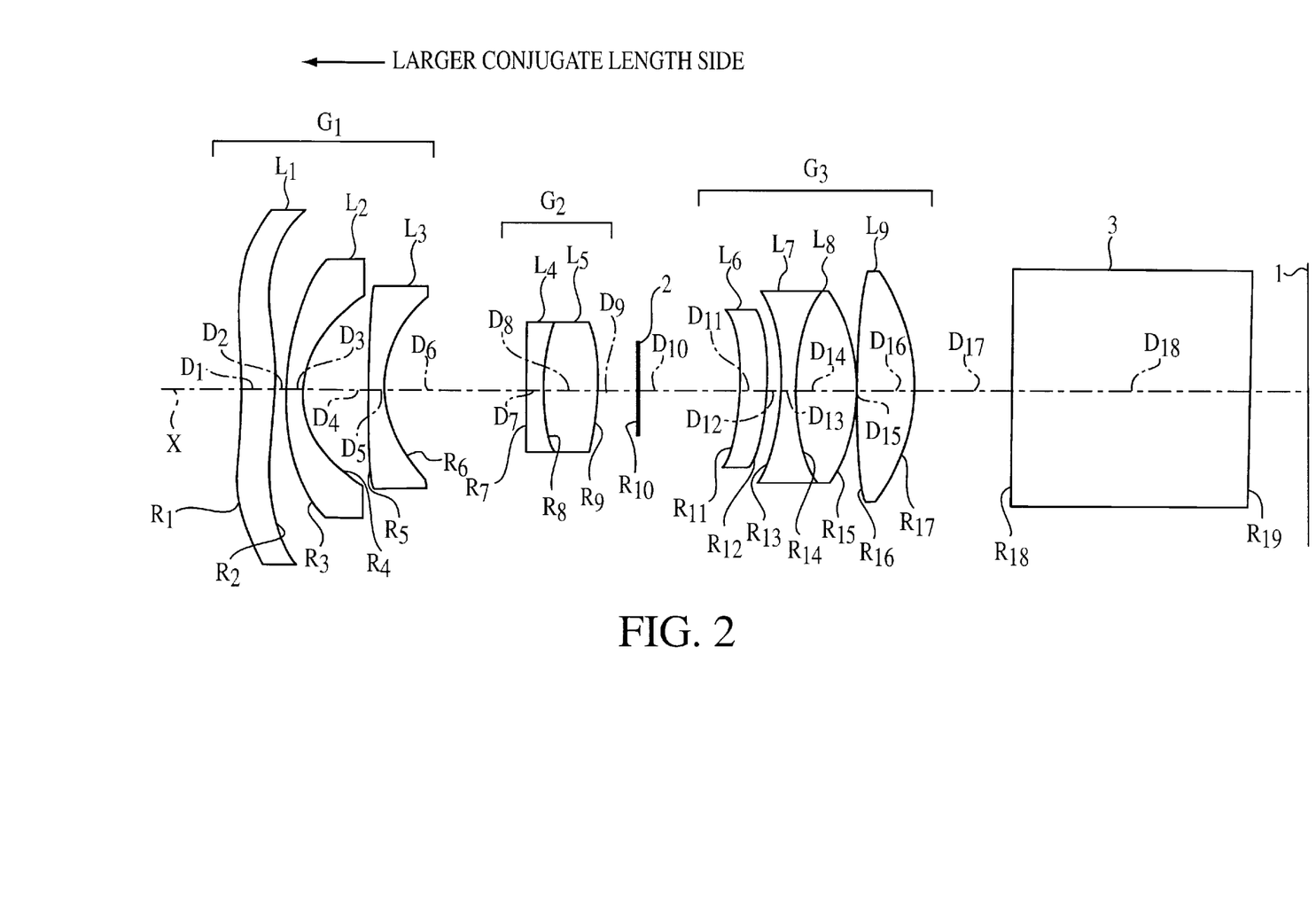
FIG. 2 shows the basis lens element structure of Embodiment 2.
Figure 3A:
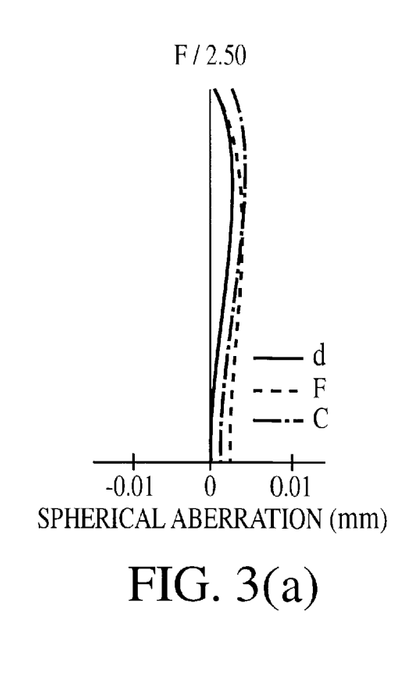
FIGS. 3(a)–3(d) show the spherical aberration at various wavelengths, astigmatism in the sagittal and tangential planes, distortion, and lateral color, respectively, of the lens of Embodiment 1.
Figure 3B:
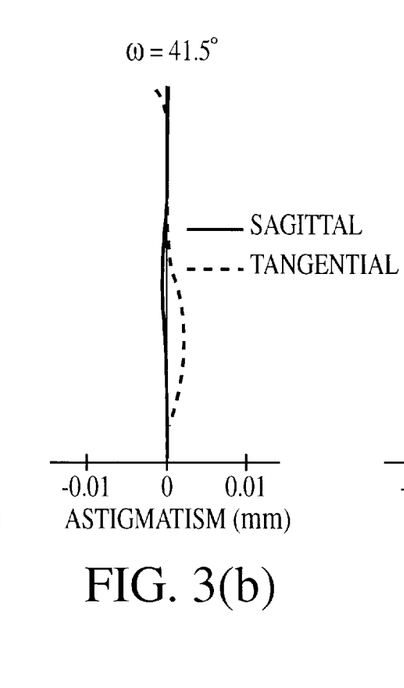
Figure 3C:
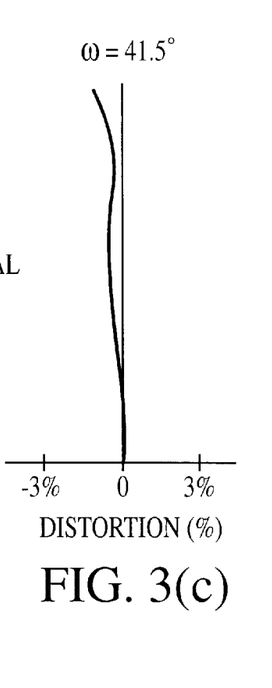
Figure 3D:
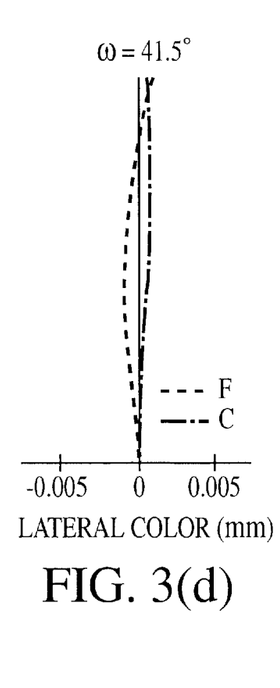
Figure 4A:
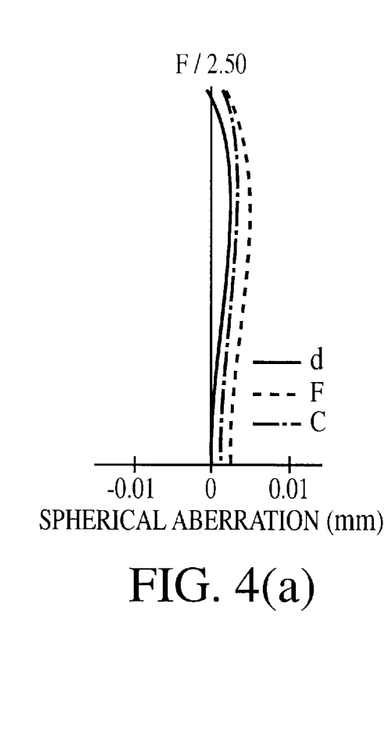
FIGS. 4(a)–4(d) show the spherical aberration at various wavelengths, astigmatism in the sagittal and tangential planes, distortion, and lateral color, respectively, of the lens of Embodiment 2.
Figure 4B:
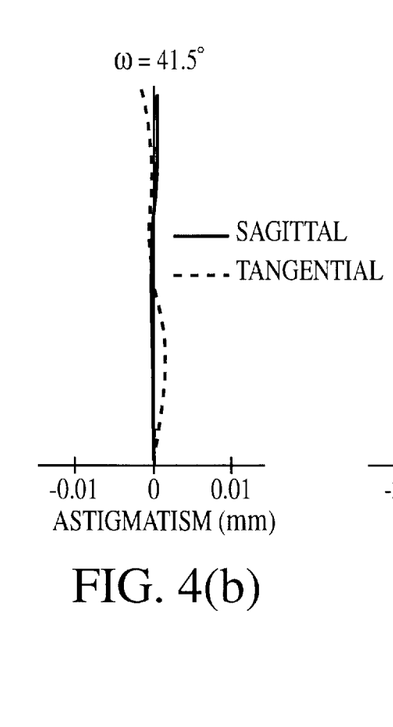
Figure 4C:
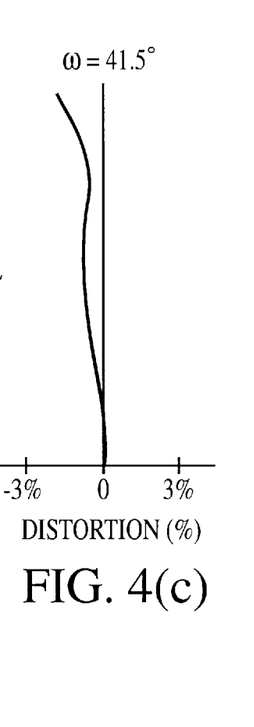
Figure 4D:
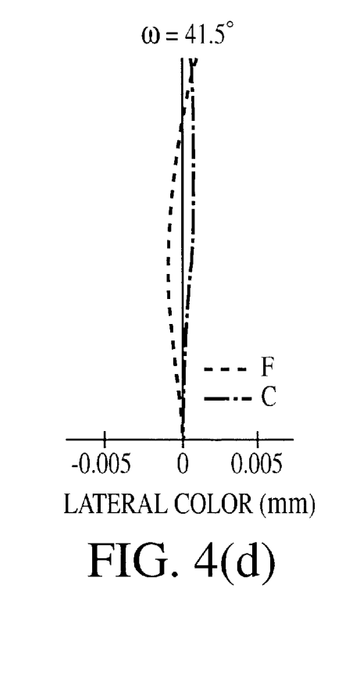

The retro-focus lens of Embodiment 2 is explained with reference to FIG. 2. The basic lens element structure of the retro-focus lens of Embodiment 2 is the same as that shown in FIG. 1 above for Embodiment 1.

The upper section of Table 3 below lists the surface number #, in order from the longer conjugate length side of the lens, the radius of curvature R (in mm) of each surface near the optical axis, the on-axis spacing D (in mm) between each surface, as well as the index of refraction $N_d$ and the Abbe number $v_d$ (at the sodium d line) of each lens element of Embodiment 2. Those surfaces with a * to the right of the surface number in Table 3 are aspherical surfaces, and the aspherical surface shape is expressed by Eq. (A) above.

The lower section of the Table 3 lists the focal distance f, the $F_{NO}$, and the image angle 2 ω of the retro-focus lens of this embodiment.

TABLE 3

| # | R | D | $N_d$ | $v_d$ |
|---|---|---|---|---|
| 1* | −6.816 | 0.306 | 1.50918 | 52.0 |
| 2* | −5.418 | 0.108 | | |
| 3 | 2.390 | 0.184 | 1.62041 | 60.3 |
| 4 | 1.115 | 0.520 | | |
| 5 | 7.061 | 0.153 | 1.62041 | 60.3 |
| 6 | 1.231 | 1.256 | | |
| 7 | 11.193 | 0.134 | 1.48749 | 70.4 |
| 8 | 1.628 | 0.525 | 1.67003 | 47.2 |
| 9 | −2.414 | 0.337 | | |
| 10 | ∞ | 0.891 | | |
| 11* | −2.567 | 0.230 | 1.50918 | 52.0 |
| 12* | −2.445 | 0.145 | | |
| 13 | −2.414 | 0.142 | 1.84666 | 23.8 |
| 14 | 2.296 | 0.566 | 1.51680 | 64.2 |
| 15 | −1.761 | 0.008 | | |
| 16 | 7.551 | 0.511 | 1.77250 | 49.6 |
| 17 | −2.063 | 0.849 | | |
| 18 | ∞ | 2.105 | 1.51680 | 64.2 |
| 19 | ∞ | | | |
| | f = 1.0 | $F_{NO}$ = 2.5 | $2\tilde{\omega}$ = 83.0 | |

Moreover, as shown in the bottom portion of Table 3, the focal length f of the retro-focus lens is 1.0, the $F_{NO}$ is 2.5 and the image angle 2 ω is 83.0° for this embodiment.

In Table 4, the eccentricity K and the aspherical coefficients $A_4$, $A_6$, $A_8$, and $A_{10}$ are shown for those surfaces indicated in Table 3 as being aspherical.

TABLE 4

| # | K | $A_4$ | $A_6$ | $A_8$ | $A_{10}$ |
|---|---|---|---|---|---|
| 1 | 1.06463 | 0.61011 × 10⁻¹ | −0.48269 × 10⁻² | 0.80674 × 10⁻³ | 0.16999 × 10⁻⁴ |
| 2 | 1.01701 | 0.65214 × 10⁻¹ | −0.19858 × 10⁻² | −0.26216 × 10⁻³ | −0.63695 × 10⁻⁶ |
| 11 | 2.44520 | −0.26432 × 10⁻¹ | −0.62042 × 10⁻³ | 0.19473 × 10⁻⁴ | 0.15208 × 10⁻⁶ |
| 12 | 0.11258 | 0.90897 × 10⁻¹ | 0.61896 × 10⁻³ | −0.34268 × 10⁻⁴ | −0.13635 × 10⁻⁶ |

In addition, the above-mentioned Conditions (1) to (8) are all satisfied for each Embodiment, as shown in Table 5 below.

TABLE 5

|  | Embodiment 1 | Embodiment 2 |
| --- | --- | --- |
| Condition (1) value: | 2.25 | 2.24 |
| Condition (2) value: | 44.48 | 48.32 |
| Condition (3) value: | 29.52 | 61.76 |
| Condition (4) value: | 0.153 | 0.214 |
| Condition (5) value: | −1.33 | −1.36 |
| Condition (6) value: | 2.19 | 2.18 |
| Condition (7) value: | 26.2 | 23.2 |
| Condition (8) value: | 46.6 | 40.4 |

In addition, the spherical aberration, astigmatism, distortion and lateral color corresponding to the above-noted Embodiments 1 and 2 are shown in FIG. 3 and FIG. 4, respectively. Also, in these aberration figures, ω indicates the half-image angle. As clearly shown in FIGS. 3(a)–3(d) and FIGS. 4(a)–4(d), according to each embodiment mentioned above, various aberrations, particularly lateral color and distortion, can be made small.

Moreover, the spherical aberration relative to the d-line (587.56 nm), the F-line (486.13 nm) and the C-line (565.27 nm) are shown for both the sagittal and tangential image surface for each embodiment. Also, the lateral color for both the F-line and C-line is shown for each embodiment.

In summary, according to the present invention the first lens group has negative refractive power and includes a first lens element of small positive refractive power that is made of plastic with its surface on the longer conjugate length side of the lens being aspherical, a second lens element of negative refractive power and made of glass, with a concave surface on the shorter conjugate length side of the lens, and a third lens element of negative refractive power with a concave surface on the shorter conjugate length side of the lens.

By satisfying preferred conditions, the lens of the present invention favorably corrects aberrations such as axial color, lateral color and distortion while maintaining high image-formation properties. Moreover, effects due to temperature change on the plastic lens elements are mitigated. Also, a wider image angle as well as a higher resolution are provided. In addition, the light flux formed by the lens has telecentric properties, and this can prevent problems which arise when the lens is used with liquid crystal display panels.

The invention being thus described, it will be obvious that the same may be varied in many ways. For example the radius of curvature R of each lens element and the on-axis surface spacing D, may be readily scaled to provide a lens of a different focal length and resolution. Moreover, the shape and number of lens elements of the second lens group and the third lens group can be suitably changed. Also, the lens of the present invention is not limited to projection applications but can also be used as an image-formation lens. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

I claim:

1. A retro-focus lens comprising, in order from the longer conjugate length side of the lens:

a first lens group of negative refractive power, said first lens group including, in order from the longer conjugate length side of the lens, a first lens element of positive refractive power and made of plastic with its surface on the longer conjugate length side of the lens being aspherical, a second lens element of negative refractive power and made of glass and with a concave surface on the shorter conjugate length side of the lens, and a third lens element having negative refractive power with a concave surface on the shorter conjugate length side of the lens, there being no additional lens elements between said first lens element and said third lens element;

a second lens group of positive refractive power; and a third lens group of positive refractive power.

2. The retro-focus lens of claim 1, said second lens group including, in order from the longer conjugate length side of the lens, a fourth lens element having negative refractive power and a fifth lens element having positive refractive power, wherein said fourth lens element and said fifth lens element are cemented together.

3. The retro-focus lens of claim 2, said third lens group including, in order from the longer conjugate length side of the lens, a sixth lens element, made of plastic, having two surfaces of different refractive power, with at least one surface being an aspherical surface and with the surface of smaller refractive power being on the longer conjugate length side of the lens.

4. The retro-focus lens of claim 3, wherein the third lens group further comprises, in order from the longer conjugate length side of the lens:

a seventh lens element having negative refractive power;

an eighth lens element having positive refractive power; and, a ninth lens element having positive refractive power;

wherein the seventh lens element and the eighth lens element are cemented together.

5. The retro-focus lens of claim 4, wherein the following condition is satisfied:

$$\nu_{14} - \nu_{13} > 32$$

where $\nu_{14}$ is an Abbe number of the eighth lens element, and $\nu_{13}$ is an Abbe number of the seventh lens element.

6. The retro-focus lens of claim 2, said retro-focus lens further satisfying the following condition:

$$\nu_8 - \nu_{10} > 20$$

where $\nu_8$ is the Abbe number of the fourth lens element and $\nu_{10}$ is the Abbe number of the fifth lens element.

7. The retro-focus lens of claim 3, said retro-focus lens further satisfying the following condition:

$$|f_6/f| > 25.0$$

where $f_6$ is the focal length of the sixth lens element, and f is the focal length of the lens.

8. The retro-focus lens of claim 1, said retro-focus lens further satisfying the following condition:

$$B_f/f > 2.1$$

where

B_f is the back focus of the lens, and f is the focal length of the lens.

9. The retro-focus lens of claim 1, said retro-focus lens further satisfying the following condition:

$$|f_1/f|>35.0$$

where $f_1$ is the focal length of the first lens element and f is the focal length of the lens.

10. The retro-focus lens of claim 1, said retro-focus lens further satisfying the following condition:

$$-0.1<f/f_{G12}<0.25$$

where f is the focal length of the lens, and $f_{G12}$ is the composite focal length of the first lens group and the second lens group.

11. The retro-focus lens of claim 1, said retro-focus lens further satisfying the following condition:

$$-1.9<f_{G1}/f<-1.0$$

where $f_{G1}$ is the focal length of the first lens group, and f is the focal length of the lens.

12. The retro-focus lens of claim 1, said retro-focus lens further satisfying the following condition:

$$1.6<f_{G3}/f<2.8$$

where $f_{G3}$ is the focal length of the third lens group and f is the focal length of the lens.

* * * * *

UNITED STATES PATENT AND TRADEMARK OFFICE
CERTIFICATE OF CORRECTION

PATENT NO : 6,160,671
DATED : Dec. 12, 2000
INVENTOR(S): Nakazawa

It is certified that error appears in the above-identified patent and that said Letters Patent are hereby corrected as shown below:

In column 2, at line 55: change  " $-1.9 < f_{G12} / f < -1.0$     Condition (5)" to:

-- $-1.9 < f_{G1} / f < -1.0$     Condition (5) --

Signed and Sealed this

First Day of May, 2001

Attest:

NICHOLAS P. GODICI

*Attesting Officer*     *Acting Director of the United States Patent and Trademark Office*